United States Patent
Liang (10) Patent No.: US 9,525,645 B2
(45) Date of Patent: Dec. 20, 2016

(54) CONNECTING STACK MEMBER DEVICES IN STACKED SWITCHES SYSTEMS

(71) Applicant: Hangzhou H3C Technologies Co., Ltd., Hangzhou (CN)

(72) Inventor: Xuewei Liang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/651,587

(22) PCT Filed: Jan. 21, 2014

(86) PCT No.: PCT/CN2014/070948
§ 371 (c)(1),
(2) Date: Jun. 11, 2015

(87) PCT Pub. No.: WO2014/114218
PCT Pub. Date: Jul. 31, 2014

(65) Prior Publication Data
US 2015/0334052 A1    Nov. 19, 2015

(30) Foreign Application Priority Data
Jan. 22, 2013  (CN) .......................... 2013 1 0024984

(51) Int. Cl.
*H04L 12/28*   (2006.01)
*H04L 12/933*  (2013.01)
*H04J 1/16*    (2006.01)

(52) U.S. Cl.
CPC .................... *H04L 49/15* (2013.01)

(58) Field of Classification Search
USPC ................. 370/258, 369, 403, 427
See application file for complete search history.

(56) References Cited

U.S. PATENT DOCUMENTS 5,959,968 A * 9/1999 Chin ................... H04L 12/4604
                                                370/216
6,289,021 B1 * 9/2001 Hesse ................. H04L 12/5601
                                                370/400

(Continued)

FOREIGN PATENT DOCUMENTS

CN  101110782  1/2008
CN  101163077  4/2008

(Continued)

OTHER PUBLICATIONS

International Search Report and Written Opinion dated Apr. 29, 2014 issued on PCT Patent Application No. PCT/CN2014/070948 dated Jan. 21, 2014, The State Intellectual Property Office, P.R. China.

(Continued)

*Primary Examiner* — John Pezzlo
(74) *Attorney, Agent, or Firm* — Hewlett Packard Enterprise Patent Department (57) ABSTRACT

A stacked switches system may include multiple stack member devices, which belong to more than two stack groups. Number of the stack groups is less than number of the stack member devices. Stack member devices in a same stack group may be connected with each other via a first stack link. Each stack member device may be connected with a stack member device in an adjacent stack group via a second stack link.

18 Claims, 8 Drawing Sheets

(56) References Cited

U.S. PATENT DOCUMENTS

| | | | |
|---|---|---|---|
| 2004/0105389 A1* | 6/2004 | Huang | H04J 14/0283 370/238 |
| 2006/0007854 A1* | 1/2006 | Yu | H04J 3/085 370/229 |
| 2008/0138067 A1 | 6/2008 | Beshai | |
| 2012/0155254 A1* | 6/2012 | Hinosugi | H04L 49/557 370/228 |
| 2012/0314581 A1 | 12/2012 | Rajamanickam et al. | |

FOREIGN PATENT DOCUMENTS

| | | |
|---|---|---|
| CN | 101488893 | 7/2009 |
| CN | 103220234 | 7/2013 |

OTHER PUBLICATIONS

Extended European Search Report, EP Application No. 14742901.3, Date: Jun. 6, 2016, pp. 1-7.

* cited by examiner

CONNECTING STACK MEMBER DEVICES IN STACKED SWITCHES SYSTEMS

CLAIM FOR PRIORITY

The present application is a national stage filing under 35 U.S.C. §371 of PCT application number PCT/CN2014/070948, having an international filing date of Jan. 21, 2014, which claims priority to Chinese patent application number 201310024984.2, having a filing date of Jan. 22, 2013, the disclosures of which are hereby incorporated by reference in their entireties.

BACKGROUND

A "stack" refers to a plurality of stackable switching devices that are connected to work together. The stack may provide a large number of ports. The plurality of switching devices forming the stack may be configured to form a virtual device. The virtual device may act as a single switch even though the ports may be distributed among the individual switching devices forming the stack. The virtual device may be referred to as a stacked switches system. Each switching device in the stacked switches system may be referred to as a member device.

DETAILED DESCRIPTIONS

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

In the present disclosure, the mode for connecting more than two stack member devices of a stack group in a ring may be as follows.

Figure 1:
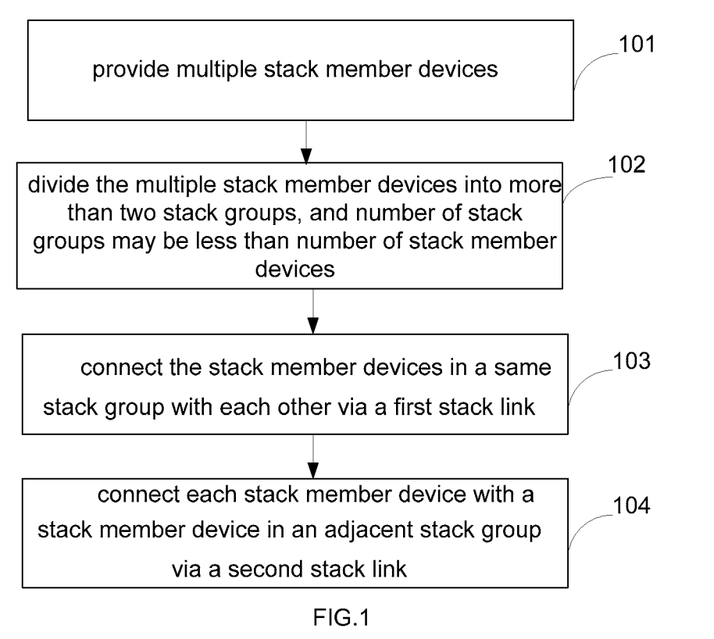
FIG. 1 is a flowchart illustrating a method for implementing a stacked switches system, in accordance with an example of the present disclosure.

FIG. 1 is a flowchart illustrating a method for implementing a stacked switches system, in accordance with an example of the present disclosure. The method may include the following blocks.

In block 101, provide multiple stack member devices.

In block 102, divide the multiple stack member devices into more than two stack groups. Number of stack groups may be less than number of stack member devices.

In block 103, connect the stack member devices in a same stack group with each other via a first stack link.

In block 104, connect each stack member device with each stack member device in an adjacent stack group via a second stack link.

A FIRST EXAMPLE

Figure 2:
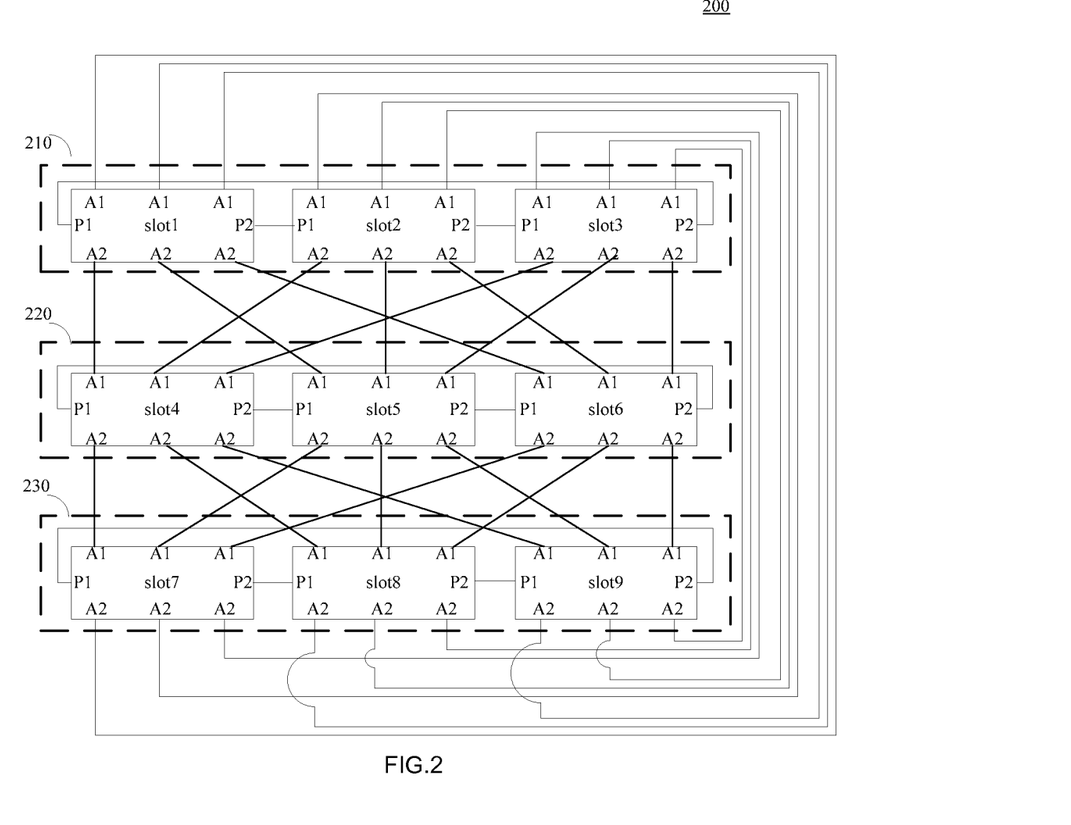
FIG. 2 is a schematic diagram illustrating a first connection mode among stack groups in a matrix stacked switches system, in accordance with an example of the present disclosure.

With reference to the stacked switches system 200 shown in FIG. 2. In stack group 210, neighbors of switch slot 1 are switches slot 2 and slot 3;, neighbors of switch slot 2 are switches slot 1 and slot 3; neighbors of switch slot 3 are switches slot 1 and slot 2. A first intra-group stack port P1 of switch slot 1 may be connected with a second intra-group stack port P2 of switch slot 3 by using a stack link. A second intra-group stack port P2 of switch slot 1 may be connected with a first intra-group stack port P1 of switch slot 2 by using a stack link. A second intra-group stack port P2 of switch slot 2 may be connected with a first intra-group stack port P1 of switch slot 3 by using a stack link. Thus, by using stack links, switches slot 1, slot 2 and slot 3 may be connected with each other to form a stack group 210 with a ring topology. Based on the same mode, switches slot 4, slot 5 and slot 6 may be connected with each other to form a stack group 220 with the ring topology by using stack links. Switches slot 7, slot 8 and slot 9 may be connected with each other to form a stack group 230 with the ring topology, by using stack links.

Two stack groups are adjacent to each other if they are next to each other in the stack. For example, if a switch in a first stack group is directly connected to a switch in a second stack group, then the first and second stack groups are 'adjacent'. Thus, in FIG. 2 stack group 210 is adjacent to stack group 230 and stack group 220. Stack group 220 is respectively adjacent to stack group 210 and stack group 230. Stack group 230 is respectively adjacent to stack group 220 and stack group 210.

Switches slot 1 to slot 9 may respectively include three first inter-group stack ports A1 and three second inter-group stack ports A2.

Three first inter-group stack ports A1 of switch slot 1 may be respectively connected with a second inter-group stack port A2 of switch slot 7, a second inter-group stack port A2 of switch slot 8 and a second inter-group stack port A2 of switch slot 8, by using three stack links. Three second inter-group stack ports A2 of switch slot 1 may be respectively connected with a first inter-group stack port A1 of switch slot 4, a first inter-group stack port A1 of switch slot 5 and a first inter-group stack port A1 of switch slot 6, by using three stack links.

Three first inter-group stack ports A1 of switch slot 2 may be respectively connected with a second inter-group stack port A2 of switch slot 7, a second inter-group stack port A2 of switch slot 8 and a second inter-group stack port A2 of switch slot 9, by using three stack links. Each second inter-group stack port A2 of switch slot 2 may be connected with a respective first inter-group stack port A1 of switches slot 4, slot 5 and slot 6, by using three stack links.

Three first inter-group stack ports A1 of switch slot 3 may be respectively connected with a second inter-group stack port A2 of switch slot 7, a second inter-group stack port A2 of switch slot 8, and a second inter-group stack port A2 of switch slot 9, by using three stack links. Three second inter-group stack ports A2 of switch slot 3 may be respectively connected with a first inter-group stack port A1 of switch slot 4, a first inter-group stack port A1 of switch slot 5 and a first inter-group stack port A1 of switch slot 6, by using three stack links.

Three second inter-group stack ports A2 of switch slot 4 may be respectively connected with a first inter-group stack port A1 of switch slot 7, a first inter-group stack port A1 of switch slot 8 and a first inter-group stack port A1 of switch slot 9, by using three stack links.

Three second inter-group stack ports A2 of switch slot 5 may be respectively connected with a first inter-group stack port A1 of switch slot 7, a first inter-group stack port A1 of switch slot 8, and a first inter-group stack port A1 of switch slot 9, by using three stack links.

Three second inter-group stack ports A2 of slot 6 may be respectively connected with a first inter-group stack port A1 of switch slot 7, a first inter-group stack port A1 of switch slot 8, and a first inter-group stack port A1 of switch slot 9, by using three stack links.

Bind stack links connected with the first inter-group stack ports A1 of switches slot 1, slot 2 and slot 3 to form a first aggregated stack link group of stack group 210. Bind stack links connected with the second inter-group stack ports A2 of switches slot 1, slot 2 and slot 3 to form a second aggregated stack link group of stack group 210. Bind stack links connected with the first inter-group stack ports A1 of switches slot 4, slot 5 and slot 6 to form a first aggregated stack link group of stack group 220. Bind stack links connected with the second inter-group stack ports A2 of switches slot 4, slot 5 and slot 6 to form a second aggregated stack link group of stack group 220. Bind stack links connected with the first inter-group stack ports A1 of switches slot 7, slot 8 and slot 9 to form a first aggregated stack link group of stack group 230. Bind stack links connected with the second inter-group stack ports A2 of switches slot 7, slot 8 and slot 9 to form a second aggregated stack link group of stack group 230.

Since each switch may be connected with each neighbor switch of the same stack group via a stack link, and may also be connected with a switch of an adjacent stack group via a stack link. The stacked switches system 200 in FIG. 2 may possess a matrix topology.

When stack group 210, stack group 220 and stack group 230 are respectively taken as a whole, subsequently, three stack groups in the stacked switches system 200 shown in FIG. 2 may be connected with each other in a ring.

A SECOND EXAMPLE

Figure 3:
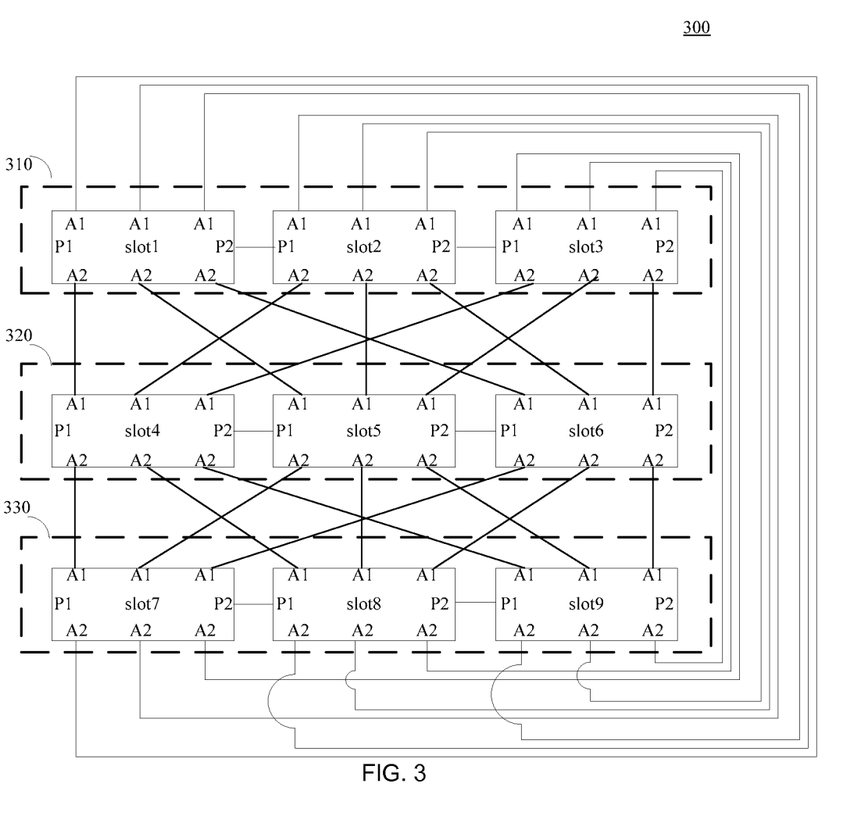
FIG. 3 is a schematic diagram illustrating a second connection mode among stack groups in a matrix stacked switches system, in accordance with an example of the present disclosure.

With reference to the stacked switches system 300 shown in FIG. 3. The first intra-group stack ports P1 of switches slot 1, slot 4 and slot 7 are invalid. The second intra-group stack ports P2 of slot 3, slot 6 and slot 9 are invalid. In a stack group 310, neighbors of switch slot 1 are switches slot 2 and slot 3; neighbors of switch slot 2 are switches slot 1 and slot 3; neighbors of switch slot 3 are switches slot 1 and slot 2. The second intra-group stack port P2 of switch slot 1 may be connected with the first intra-group stack port P1 of switch slot 2 via a stack link. The second intra-group stack port P2 of switch slot 2 may be connected with the first intra-group stack port P1 of switch slot 3 via a stack link. Thus, switches slot 1, slot 2 and slot 3 may be connected with each other to form the stack group 310 with a chain topology, by using stack links.

Based on the same mode, switches slot 4, slot 5 and slot 6 may be connected with each other to form a stack group 320 with a chain topology, by using stack links. Switches slot 7, slot 8 and slot 9 may be connected with each other to form a stack group 330 with a chain topology, by using stack links.

Switches slot 1 to slot 9 may respectively include three first inter-group stack ports A1, and three second inter-group stack ports A2. Each first inter-group stack port A1 of switches slot 1 to slot 9 may be connected with a second inter-group stack port A2 of a switch in an adjacent stack group, by using a stack link. As shown in FIG. 3, the stacked switches system 400 may possess a matrix topology.

Bind stack links connected with the first inter-group stack ports A1 of switches slot 1, slot 2 and slot 3 to form a first aggregated stack link group of stack group 310. Bind stack links connected with the second inter-group stack ports A2 of switches slot 1, slot 2 and slot 3 to form another second aggregated stack link group of stack group 310. Bind stack links connected with the first inter-group stack ports A1 of switches slot 4, slot 5 and slot 6 to form a first aggregated stack link group of stack group 320. Bind stack links connected with the second inter-group stack ports A2 of switches slot 4, slot 5 and slot 6 to form a second aggregated stack link group of stack group 320. Bind stack links connected with the first inter-group stack ports A1 of switches slot 7, slot 8 and slot 9 to form a first aggregated stack link group of stack group 330. Bind stack links connected with the second inter-group stack ports A2 of switches slot 7, slot 8 and slot 9 to form a second aggregated stack link group of stack group 330.

When three switches of stack group 310, three switches of stack group 320 and three switches of stack group 330 are respectively taken as a whole, subsequently, stack groups 310, 320 and 330 may be connected with each other in a ring.

A THIRD EXAMPLE

Figure 4:
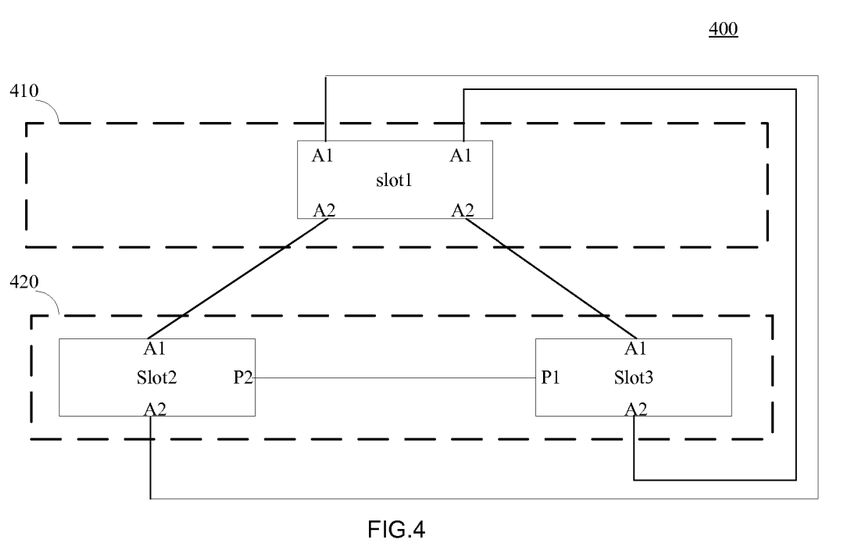
FIG. 4 is a schematic diagram illustrating a third connection mode among stack groups in a matrix stacked switches system, in accordance with an example of the present disclosure.

With reference to the stacked switches system 400 shown in FIG. 4, stack group 410 may possess one switch slot 1. The second intra-group stack port P2 of switch slot 2 may be connected with the first intra-group stack port P1 of switch slot 3 via a stack link, to form a stack group 420 with a chain topology.

Two first inter-group stack ports A1 and two second inter-group stack ports A2 are set for switch slot 1. That is, number of first inter-group stack port A1 and number of second inter-group stack port A2 of switch slot 1 may be same as number of stack member devices in stack group 420.

One first inter-group stack port A1 and one second inter-group stack port A2 are set for each of switches slot 2 and slot 3. That is, for switches slot 2 and slot 3, number of first inter-group stack port A1 and number of second inter-group stack port A2 are the same as number of stack member devices in stack group 410.

Two first inter-group stack ports A1 of switch slot 1 may be respectively connected with the second inter-group stack port A2 of switches slot 2 and slot 3, by using two stack links. Two second inter-group stack ports A2 of switch slot 1 may be respectively connected with one first inter-group stack port A1 of switches slot 2 and slot 3, by using two stack links.

A FOURTH EXAMPLE

Figure 5:
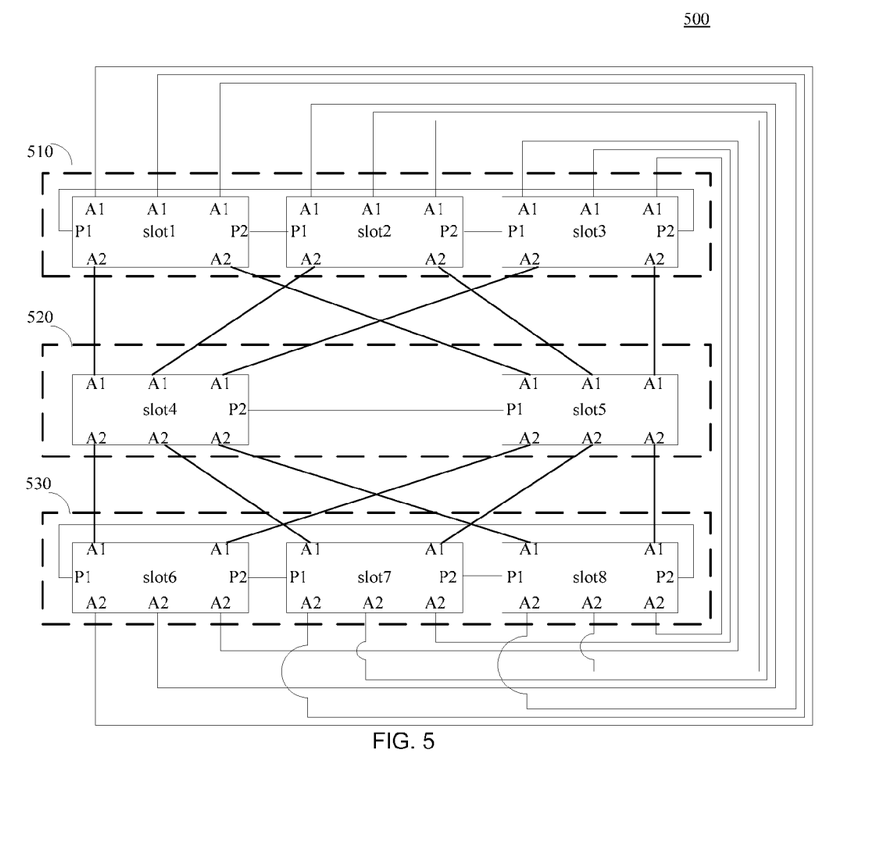
FIG. 5 is a schematic diagram illustrating a fourth connection mode among stack groups in a matrix stacked switches system, in accordance with an example of the present disclosure.

With reference to the stacked switches system 500 shown in FIG. 5, switch slot 4 may possess a second intra-group stack port P2. Switch slot 5 may possess a first intra-group stack port P1.

In stack group 510, neighbors of switch slot 1 are switches slot 2 and slot 3; neighbors of switch slot 2 are switches slot 1 and slot 3; neighbors of switch slot 3 are switches slot 1 and slot 2. A first intra-group stack port P1 of switch slot 1 may be connected with a second intra-group stack port P2 of switch slot 3 by using a stack link. A second intra-group stack port P2 of switch slot 1 may be connected with a first intra-group stack port P1 of switch slot 2 by using a stack link. A second intra-group stack port P2 of switch slot 2 may be connected with a first intra-group stack port P1 of switch slot 3 by using a stack link. Thus, by using stack links, switches slot 1, slot 2 and slot 3 may be connected with each other to form a stack group 510 with a ring topology. Based on the same mode, switches slot 6, slot 7 and slot 8 may be connected with each other to form a stack group 530 with the ring topology by using stack links. The second intra-group stack port P2 of switch slot 4 may be connected with the first intra-group stack port P1 of switch slot 5 via a stack link. Thus, switches slot 4 and slot 5 may be connected with each other to form a stack group 520 with a chain topology, by using a stack link.

Three first inter-group stack ports A1 and two second inter-group stack ports A2 are set for each of switches slot 1, slot 2 and slot 3. Three first inter-group stack ports A1 and three second inter-group stack ports A2 are set for each of switches slot 4 and slot 5. Two first inter-group stack ports A1 and three second inter-group stack ports A2 are set for each of switches slot 6, slot 7 and slot 8. Three first inter-group stack ports A1 of switch slot 1 may be respectively connected with a second inter-group stack port A2 of switches slot 6, slot 7 and slot 8. Two second inter-group stack ports A2 of switch slot 1 may be respectively connected with a first inter-group stack port A1 of switches slot 4 and slot 5.

Three first inter-group stack ports A1 of switch slot 2 may be connected with a respective second inter-group stack port A2 of switches slot 6, slot 7 and slot 8, by using three stack links. Two second inter-group stack ports A2 of switch slot 2 may be connected with a respective first inter-group stack port A1 of switches slot 4 and slot 5, by using two stack links.

Three first inter-group stack ports A1 of switch slot 3 may be connected with a respective second inter-group stack port A2 of switches slot 6, slot 7 and slot 8. Two second inter-group stack ports A2 of switch slot 3 may be connected with a respective first inter-group stack port A1 of switches slot 4 and slot 5, by using two stack links.

Three second inter-group stack ports A2 of switch slot 4 may be connected with a respective first inter-group stack port A1 of switches slot 6, slot 7 and slot 8, by using three stack links. Three second inter-group stack ports A2 of switch slot 5 may be connected with a respective first inter-group stack port A1 of switches slot 6, slot 7 and slot 8, by using three stack links.

Each first inter-group stack port A1 of a switch may be connected with a second inter-group stack port A2 of each switch in an adjacent stack group, by using a stack link. As shown in FIG. 5, the stacked switches system 500 may possess a topology similar to matrix topology.

A FIFTH EXAMPLE

Figure 6:
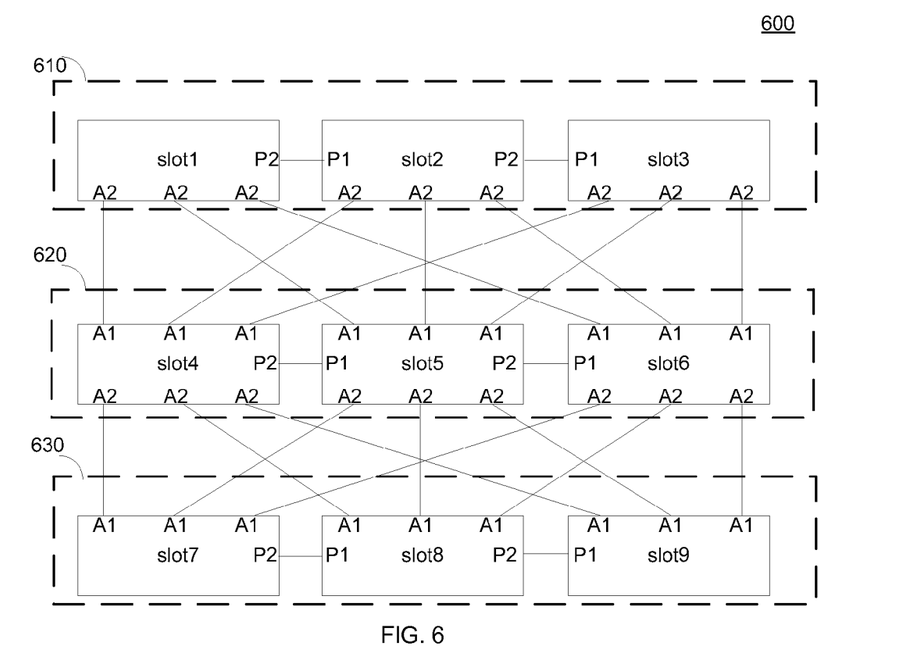
FIG. 6 is a schematic diagram illustrating a fifth connection mode among stack groups in a matrix stacked switches system, in accordance with an example of the present disclosure.

With reference to the stacked switches system 600 shown in FIG. 6. In a stack group 610, neighbor of switch slot 1 in the same stack group 610 is switch slot 2; neighbors of switch slot 2 are switches slot 1 and slot 3; neighbor of switch slot 3 is switch slot 2. The second intra-group stack port P2 of switch slot 1 may be connected with the first intra-group stack port P1 of switch slot 2 via a stack link. The second intra-group stack port P2 of switch slot 2 may be connected with the first intra-group stack port P1 of switch slot 3 via a stack link. Switches slot 1, slot 2 and slot 3 may be connected with each other to form the stack group 610 with a chain topology, by using stack links. Based on the same mode, switches slot 4, slot 5 and slot 6 may be connected with each other to form a stack group 620 with a chain topology, by using stack links. Switches slot 7, slot 8 and slot 9 may be connected with each other to form a stack group 630 with a chain topology, by using stack links.

An adjacent stack group of stack group 610 is stack group 620. Adjacent stack groups of stack group 620 are stack group 610 and stack group 630. An adjacent stack group of stack group 630 is stack group 620.

Each of switches slot 1, slot 2 and slot 3 may include three second inter-group stack ports A2. That is, number of second inter-group stack ports of each stack member device in stack group 610 may be equal to number of stack member devices in an adjacent stack group. Each of switches slot 4, slot 5 and slot 6 may include three first inter-group stack ports A1 and three second inter-group stack ports A2. That is, number of first inter-group stack ports and number of second inter-group stack ports about each stack member device in stack group 620620 may be respectively equal to number of stack member devices in an adjacent stack group. Each of switches slot 7, slot 8 and slot 9 of stack group 630 may include three first inter-group stack ports A1. That is, number of first inter-group stack ports of each stack member device in stack group 630 may be equal to number of stack member devices in an adjacent stack group.

Three second inter-group stack ports A2 of switch slot 1 may be connected with a respective first inter-group stack port A1 of switches slot 4, slot 5 and slot 6. Three second inter-group stack ports A2 of switch slot 2 may be connected with a respective first inter-group stack port A1 of switches slot 4, slot 5 and slot 6. Three second inter-group stack ports A2 of switch slot 3 may be connected with a respective first inter-group stack port A1 of switches slot 4, slot 5 and slot 6.

Three second inter-group stack ports A2 of switch slot 4 may be connected with a respective first inter-group stack port A1 of switches slot 7, slot 8 and slot 9. Three second inter-group stack ports A2 of switch slot 5 may be connected with a respective first inter-group stack port A1 of switches slot 7, slot 8 and slot 9. Three second inter-group stack ports A2 of switch slot 6 may be connected with a respective first inter-group stack port A1 of switches slot 7, slot 8 and slot 9.

Bind stack links connected with the second inter-group stack ports A2 of switches slot 1, slot 2 and slot 3, so as to form another second aggregated stack link group of stack group 610. Bind stack links connected with the first inter-group stack ports A1 of switches slot 4, slot 5 and slot 6, so as to form a first aggregated stack link group of stack group 620. Bind stack links connected with the second inter-group stack ports A2 of switches slot 4, slot 5 and slot 6, so as to form a second aggregated stack link group of stack group 620. Bind stack links connected with the first inter-group stack ports A1 of switches slot 7, slot 8 and slot 9, so as to form a first aggregated stack link group of stack group 630.

When stack group 610, stack group 620 and stack group 630 are respectively taken as a whole, as shown in FIG. 6, three stack groups in the stacked switches system 600 may be connected with each other in a chain, by using an aggregated stack link group.

Each switch may be connected with a neighbor switch in the same stack group via a stack link, and may also be connected with a switch in an adjacent stack group via a stack link. As shown in FIG. 6, the stacked switches system 600 may possess a matrix topology.

Each stack port of a switch is a logical port used for stacking. Each stack port may be bound with a physical port. That is, a physical port bound with a stack port may be taken as a member port of the stack port. Correspondingly, physical links connected with each member port may form stack links connected with a stack port, and may be taken as a member link of the stack link.

A SIXTH EXAMPLE

Figure 7:
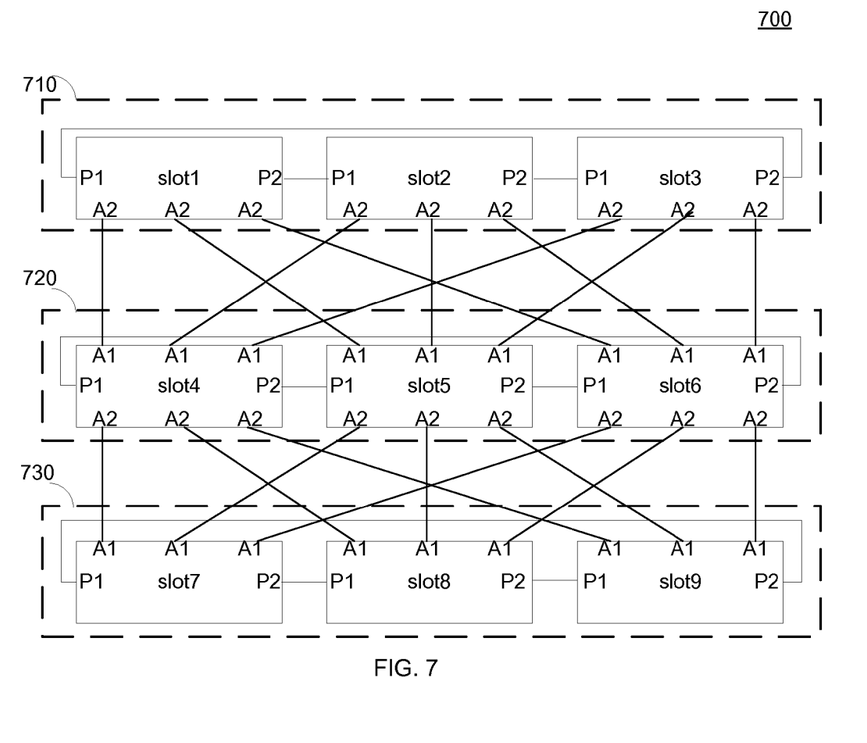
FIG. 7 is a schematic diagram illustrating a sixth connection mode among stack groups in a matrix stacked switches system, in accordance with an example of the present disclosure.

With reference to the stacked switches system 700 shown in FIG. 7, switches slot 1, slot 2 and slot 3 may be connected with each other to form a stack group 710 with a ring topology, by using stack links. Switches slot 4, slot 5 and slot 6 may be connected with each other to form a stack group 720 with a ring topology, by using stack links. Switches slot 7, slot 8 and slot 9 may be connected with each other to form a stack group 730 with a ring topology, by using stack links.

Each of switches slot 1, slot 2 and slot 3 may include three second inter-group stack ports A2. Each of switches slot 4, slot 5 and slot 6 may include three first inter-group stack ports A1 and three second inter-group stack ports A2. Each of switches slot 7, slot 8 and slot 9 may include three first inter-group stack ports A1.

The mode for connecting inter-group stack ports of switches in the stacked switches system 700 shown in FIG. 7 may be the same as another mode, which is used for connecting inter-group stack ports of switches in the stacked switches system 600 shown in FIG. 6.

A SEVENTH EXAMPLE

Figure 8:
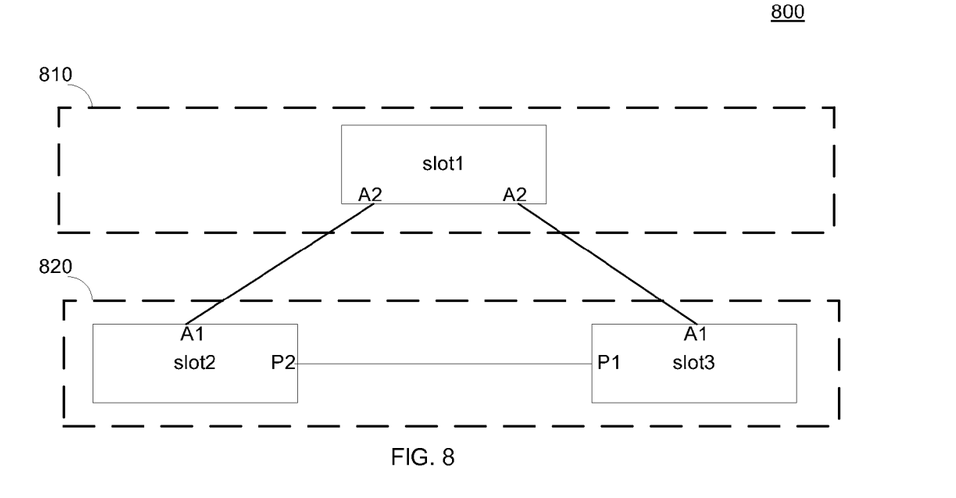
FIG. 8 is a schematic diagram illustrating a seventh connection mode among stack groups in a matrix stacked switches system, in accordance with an example of the present disclosure.

With reference to the stacked switches system 800 shown in FIG. 8, stack group 810 may possess a switch slot 1. The second intra-group stack port P2 of switch slot 2 may be connected with the first intra-group stack port P1 of switch slot 3 to form a stack group 820 with a chain topology, by using a stack link. Stack groups 810 and 820 are adjacent stack groups. Two second inter-group stack ports A2 are set for switch slot 1. One first inter-group stack port A1 may be set for each of switches slot 2 and slot 3. Two second inter-group stack ports A2 of switch slot 1 may be respectively connected with the first inter-group stack port A1 of switch slot 2, and the first inter-group stack port A1 of switch slot 3.

Bind stack links connected with two second inter-group stack ports A2 of switch slot 1, so as to form a second aggregated stack link group of stack group 810. Bind stack links connected with the respective first inter-group stack port A1 of switches slot 2 and slot 3, so as to form a first aggregated stack link group of stack group 820.

When stack group 810 and stack group 820 are respectively taken as a whole, two stack groups of stacked switches system 800 may be connected with each other in a chain, by using an aggregated stack link group.

AN EIGHTH EXAMPLE

Figure 9:
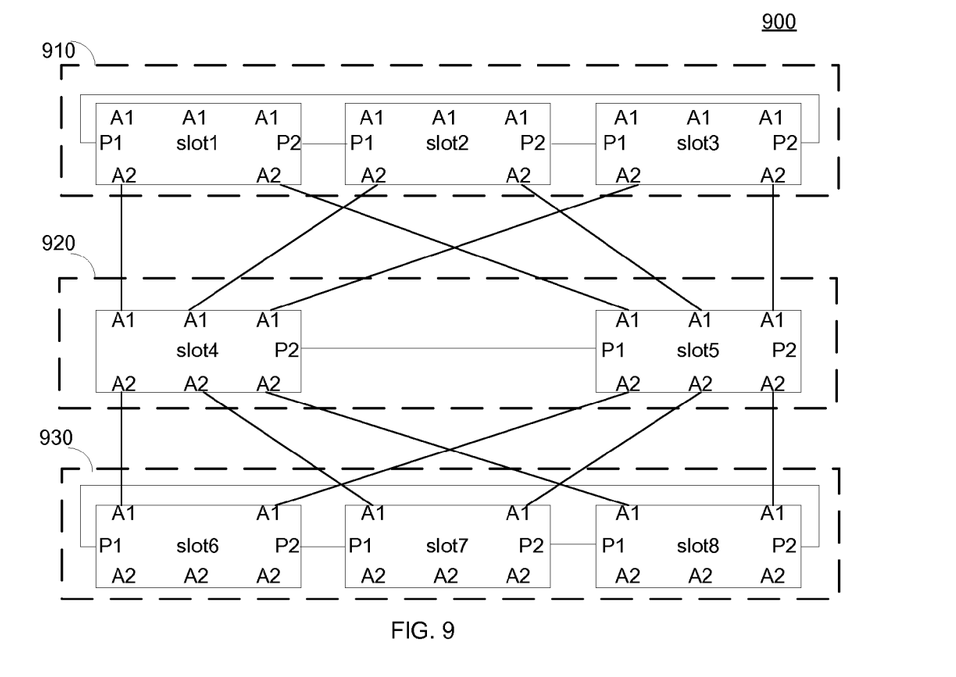
FIG. 9 is a schematic diagram illustrating an eighth connection mode among stack groups in a matrix stacked switches system, in accordance with an example of the present disclosure.

With reference to the stacked switches system 900 shown in FIG. 9, switches slot 1, slot 2 and slot 3 may be connected with each other to form a stack group 910 with a ring topology, by using stack links. Switches slot 4 and slot 5 may be connected with each other to form a stack group 920 with a chain topology, by using stack links. Switches slot 6, slot 7 and slot 8 may be connected with each other to form a stack group 930 with a ring topology, by using stack links.

An adjacent stack group of stack group 910 is stack group 920. Adjacent stack groups of stack group 920 are respectively stack group 910 and stack group 930. An adjacent stack group of stack group 930 is stack group 920.

Each of switches slot 1, slot 2 and slot 3 may include two second inter-group stack ports A2. The first inter-group stack port A1 about each of switches slot 1, slot 2 and slot 3 is invalid.

Each of switches slot 4 and slot 5 may include three first inter-group stack ports A1 and three second inter-group stack ports A2.

Each of switches slot 6, slot 7 and slot 8 in stack group 930 may include two first inter-group stack ports A1. The respective second inter-group stack port A2 of switches slot 6, slot 7 and slot 8 is invalid.

Two second inter-group stack ports A2 of switch slot 1 may be connected with a respective first inter-group stack port A1 of switches slot 4 and slot 5. Two second inter-group stack ports A2 of switch slot 2 may be connected with a respective first inter-group stack port A1 of switches slot 4 and slot 5. Two second inter-group stack ports A2 of switch slot 3 may be connected with a respective first inter-group stack port A1 of switches slot 4 and slot 5.

Three second inter-group stack ports A2 of switch slot 4 may be connected with a respective first inter-group stack port A1 of switches slot 6, slot 7 and slot 8. Three second inter-group stack ports A2 of switch slot 5 may be connected with a respective first inter-group stack port A1 of switches slot 6, slot 7 and slot 8.

Bind stack links connected with the second inter-group stack ports A2 of switches slot 1, slot 2 and slot 3, so as to form a second aggregated stack link group of stack group 910. Bind stack links connected with the first inter-group stack ports A1 of switches slot 4 and slot 5, so as to form a first aggregated stack link group of stack group 920. Bind stack links connected with the second inter-group stack ports A2 of switches slot 4 and slot 5, so as to form a second aggregated stack link group of stack group 920. Bind stack links connected with the first inter-group stack ports A1 of switches slot 6, slot 7 and slot 8, so as to form a first aggregated stack link group of stack group 930.

When stack group 910, stack group 920 and stack group 930 are respectively taken as a whole, as shown in FIG. 9, three stack groups in the stacked switches system 900 may be connected with each other in a chain, by using an aggregated stack link group.

Each switch may be connected with a neighbor switch in the same stack group via a stack link, and may also be connected with each switch in an adjacent stack group via a stack link. As shown in FIG. 9, the stacked switches system 900 may possess a matrix topology.

In the examples of the present disclosure, more than two stack groups may be taken as connected in a ring or in a chain, switches of all stack groups may form a stacked switches system with a matrix topology. Number of stack member devices in the stacked switches system may be greater than number of stack groups. A stack group may possess one stack member device. A stack group may also possess multiple stack member devices connected in a chain or in a ring.

Based on the foregoing technical solutions, it can be seen that, the stacked switches system formed in the present disclosure may be a stack group, to which multiple stack member devices are configured to belong. Number of stack member devices may be greater than number of stack groups. Multiple stack member devices in one stack group may be connected in a ring or in a chain. The stacked switches system may be extended, by connecting multiple stack groups in the stacked switches system.

Detailed descriptions about the mode for connecting stack member devices within a stack group of a stacked switches system, as well as detailed descriptions about the mode for connecting stack member devices among stack groups are provided in the foregoing contents.

The invention claimed is:

1. A method for forming a stacked switches system, comprising:
   providing multiple stack member devices;
   dividing the multiple stack member devices into more than two stack groups, wherein the number of the stack groups is less than number of the stack member devices;
   connecting the stack member devices of a same stack group via a first stack link;
   connecting each stack member device with a stack member device in an adjacent stack group via a second stack link, and
   binding multiple second stack links connected with a respective stack member device in an adjacent stack group so as to form an aggregated stack link group, wherein the more than two stack link groups are connected using the aggregated stack link group.

2. The method according to claim 1, wherein the stack member devices in the same stack group are connected with each other in a ring via the first stack link.

3. The method according to claim 1, wherein the stack member devices in the same stack group are connected with each other in a chain via the first stack link.

4. The method according to claim 1, wherein the more than two stack groups are connected in a ring, by using the aggregated stack link group.

5. The method according to claim 1, wherein the more than two stack groups are connected in a chain, by using the aggregated stack link group.

6. The method of claim 1, wherein stack member devices in a first stack group among the more than two stack groups each have a number of inter-group stack ports equal to a number of stack member devices in an adjacent stack group among the more than two stack groups.

7. The method of claim 1, wherein stack member devices of a first stack group among the more than two stack groups each include a first set of inter-group stack ports and a second set of inter-group stack ports, and the method comprises:
   connecting the stack member devices of the first stack group with stack member devices in a first adjacent stack group via the first set of inter-group stack ports; and
   connecting the stack member devices of the first stack group with stack member devices in a second adjacent stack group via the second set of inter-group stack ports.

8. A stacked switches system, comprising:
   multiple stack member devices, which belong to more than two stack groups, wherein:
      a number of the stack groups is less than a number of the stack member devices,
      stack member devices in a same stack group are connected with each other via a first stack link,
      each stack member device is connected with a stack member device in an adjacent stack group via a second stack link, and
      multiple second stack links connected with each stack member device of an adjacent stack group are bound to form an aggregated stack link group, the more than two stack groups being connected with each other via the aggregated stack link group.

9. The stacked switches system according to claim 8, wherein the stack member devices in the same stack group are connected with each other in a ring via the first stack link.

10. The stacked switches system according to claim 8, wherein the stack member devices in the same stack group are connected with each other in a chain via the first stack link.

11. The stacked switches system according to claim 8, wherein the more than two stack groups are connected with each other in series in a ring via the aggregated stack link group.

12. The stacked switches system according to claim 8, wherein the more than two stack groups are connected with each other in series a chain via each aggregated stack link group.

13. The stacked switches system of claim 8, wherein each stack member device in the same stack group is connected directly with all other stack member devices in the same stack group.

14. A stacked switches system, comprising:
   a plurality of stack member devices, each of stack member device of the plurality of stack member devices belonging to one of more than two stack groups, wherein:
      a number of the more than two stack groups stack groups is less than a number of the plurality of stack member devices,
      stack member devices in a same stack group are connected with each other via a first stack link, and
      each stack member device is connected directly with all stack member devices in an adjacent stack group via a second stack link.

15. The stacked switches system of claim 14, wherein stack member devices in a first stack group among the more than two stack groups each have a number of inter-group stack ports equal to a number of stack member devices in an adjacent stack group among the more than two stack groups.

16. The stacked switches system of claim 14, wherein each stack group among the more than two stack groups includes an equal number of stack member devices.

17. The stacked switches system of claim 14, wherein each stack member device in the same stack group is connected directly with all other stack member devices in the same stack group.

18. The stacked switches system of claim 14, wherein each stack member device is connected directly with all stack member devices in two adjacent stack groups.

* * * * *